(12) United States Patent  
Ishikawa et al.

(10) Patent No.: US 7,139,571 B1
(45) Date of Patent: Nov. 21, 2006

(54) CELL SEARCH CONTROL METHOD, MOBILE STATION AND MOBILE COMMUNICATIONS SYSTEM

(75) Inventors: Yoshihiro Ishikawa, Kanagawa (JP); Tetsuro Imai, Kanagawa (JP); Mamoru Sawahashi, Kanagawa (JP); Seizo Onoe, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 418 days.

(21) Appl. No.: 09/616,013

(22) Filed: Jul. 13, 2000

(30) Foreign Application Priority Data

Jul. 14, 1999 (JP) .............................. 1999/200979

(51) Int. Cl. *H04Q 7/20* (2006.01)
(52) U.S. Cl. .................. 455/434; 455/435.1; 455/438; 455/452.1
(58) Field of Classification Search ................ 455/434, 455/435, 436–442, 450, 432, 452, 422, 435.1, 455/432.1–432.3, 422.1, 452.1, 452.2; 370/431, 370/441, 320; 375/130, 356
See application file for complete search history.

(56) References Cited

U.S. PATENT DOCUMENTS

| | | | |
|---|---|---|---|
| 5,533,014 A | | 7/1996 | Willars et al. |
| 5,539,748 A | | 7/1996 | Raith |
| 5,566,366 A | | 10/1996 | Russo et al. |
| 5,873,047 A | * | 2/1999 | Nakano et al. .............. 455/561 |
| 6,108,541 A | * | 8/2000 | Yazaki et al. ............... 455/434 |
| 6,493,561 B1 | * | 12/2002 | Hasegawa .................... 455/512 |
| 6,526,028 B1 | * | 2/2003 | Kondo ........................ 370/333 |
| 6,597,674 B1 | * | 7/2003 | Obuchi et al. .............. 370/331 |
| 6,650,686 B1 | * | 11/2003 | Kondo ........................ 375/130 |
| 6,665,277 B1 | * | 12/2003 | Sriram ........................ 370/324 |
| 2002/0016190 A1 | * | 2/2002 | Higuchi et al. ............. 455/574 |
| 2002/0111163 A1 | * | 8/2002 | Hamabe ...................... 455/425 |
| 2002/0169005 A1 | * | 11/2002 | Hiramatsu et al. .......... 455/561 |
| 2003/0099209 A1 | * | 5/2003 | Laakso et al. .............. 370/311 |
| 2003/0112853 A1 | * | 6/2003 | Iwamoto et al. ............ 375/146 |

FOREIGN PATENT DOCUMENTS

CN 1132991 A 10/1996

(Continued)

OTHER PUBLICATIONS

Kazufumi Yunoki et al., "Cell Searach Strategy On W-CDMA Mobile Station," IEICE General Convention 1999, B-5-186, p. 537, Mar. 1999.

(Continued)

*Primary Examiner*—Edan Orgad
(74) *Attorney, Agent, or Firm*—Workman Nydegger

(57) ABSTRACT

A cell search control method, a mobile station and a mobile communications system can save consumption power with maintaining high accuracy for selecting a base station. The mobile station measures receiving quality (highest received power and the like) of a currently captured perch channel of a base station; automatically makes a decision as to whether the mobile station is located at a cell periphery in which the need for searching for a new perch channel is great, or located in neighborhood of a base station in which the need is little; and increases the frequency of the search at a location where the need is great and decreases it at a location where the need is little.

30 Claims, 10 Drawing Sheets

FOREIGN PATENT DOCUMENTS

| | | |
|---|---|---|
| CN | 1206311 A | 1/1999 |
| EP | 0 714 217 A2 | 5/1996 |
| EP | 714 217 | 5/1996 |
| EP | 812 119 | 12/1997 |
| EP | 853 439 | 7/1998 |
| EP | 905 923 | 3/1999 |
| GB | 2305825 A | 4/1997 |
| GB | 2 328 582 | 2/1999 |
| GB | 2328582 A | 2/1999 |
| JP | 07-288858 | 10/1995 |
| JP | 07-298332 | 11/1995 |
| JP | 07-327256 | 12/1995 |
| JP | 08-046563 | 2/1996 |
| JP | 08-107585 | 4/1996 |
| JP | 09-098131 | 4/1997 |
| JP | 11-098071 | 4/1999 |
| JP | 11-331916 | 11/1999 |

OTHER PUBLICATIONS

Association Of Radio Industries and Businesses (ARIB), "Specifications of Air-Interface for 3G Mobile System vol. 3 Ver. 1.0," pp. 8-18 and Annex—(5), Jan. 1999.

3$^{rd}$ Generation Partnership Project (3GPP), "3G TS 25.211 V3.2.0," pp. 1-40, Mar. 2000.

Kenichi Higuchi et al., "Fast Cell Search Algorithm In Inter-Cell Asynchronous DS -CDMA Mobile Radio," IEICE Trans. Commun., vol. E-81-B, No. 7, pp. 1527-1534, Jul. 1998.

K. Higuchi et al., "Experiments On Fast Cell Search Algorithm For Intercell Asynchronous W-CDMA Mobile Radio," Electronics Letters, vol. 35, No. 13, pp. 1046-1047, Jun. 1999.

Official Notice of Rejection ; Case No.: DCMH110037 Japanese Patent Application No.: 11-200979.

* cited by examiner

| TH1 | F1 |
| --- | --- |
| TH2 | F2 |
| ... | ... |
| THN | FN |

FIG.5

CELL SEARCH CONTROL METHOD, MOBILE STATION AND MOBILE COMMUNICATIONS SYSTEM

This application is based on Japanese Patent Application No. 11-200979 (1999) filed Jul. 14, 1999, the content of which is incorporated hereinto by reference.

BACKGROUND OF THE INVENTION

1. Field of the Invention

The present invention relates to a control method of call search (searching for a new perch channel), a mobile station and a mobile communications system including a mobile station and a plurality of base stations.

2. Description of the Related Art

A widespread mobile communications system such as a mobile telephone system provides services by dividing its entire service area into rather small radio zones. As shown in FIG. 1, for example, such a system comprises a plurality of base stations 111-1–111-5 covering divided radio zones, and mobile stations 112-1–112-3 carrying out communications with the base stations 111-1–111-5 by establishing radio channels between them.

Radio waves radiated from a base station at a certain transmission power propagates through space to a receiving site with attenuation. The attenuation the radio waves undergo increases with the distance between the transmitting site to the receiving site. Thus, perch channels from distant base stations are usually received at lower received power, whereas those from near base stations are received at higher received power. In practice, however, since the propagation loss changes depending on conditions such as topography and buildings as well as distance, the received powers of the perch channels from the base stations vary widely with the movement of the mobile stations. To receive signals transmitted from the base stations, it is important for each mobile station to always monitor the perch channels from the base stations and to select the best base station.

On the other hand, a technique called "intermittent reception" is applied to the mobile stations to increase the life of the batteries by saving power. Although the mobile stations in the standby mode must always monitor paging, the intermittent reception tries to minimize the power consumption by halting the receivers as long as possible when the reception is unnecessary. FIG. 2 is a schematic diagram illustrating a structure of a paging channel specified in "Specification of Air-Interface for 3G Mobile System Volume 3". According to the specification, to increase the effect of the intermittent reception effect, a number of mobile stations are divided into a plurality of groups, and paging signals for individual groups are each mapped onto a single physical channel. FIG. 2 illustrates a paging signal for one of such groups. In this figure, symbols PI's (PI1 and PI2) designate a very short signal indicating the presence or absence of the paging, and MUI's (MUI1–MUI4) include paging information (ID number of the mobile stations). Each mobile station receives the PI portion first, and then receives the MUI portion only when a decision is made that the paging takes place as a result of receiving the PI portion. This makes it possible for the mobile station to reduce its consumption power to a minimum thanks to a small duty ratio of the reception because it is enough for the mobile station to carry out the two operations: receiving the paging for the group to which the mobile station belongs and receiving only the PI portion when no paging information is present. Although FIG. 2 illustrates the paging information from one of the base stations, which is decided and selected by the mobile station, the mobile station must carry out search for the perch channels from neighboring base stations while it is moving. Since the mobile station must receive many possible perch channels in the search operation for neighboring base stations, it is important for the mobile station to limit the frequency of the search operations to a minimum in order to increase the effect of the intermittent reception.

IMT-2000 (International Mobile Telecommunication-2000) standards specifying the third generation mobile communications system are now being planned in the 3GPP (Third Generation Partnership Project). The transmission schemes of the paging information are described in "3G TS 25.211 V3.2.0" which revises the "Specification of Air-Interface for 3G Mobile System Volume 3" a little to increase versatility. Specifically, the information indicating the presence and absence of the paging is transmitted over a PICH (Paging Indicator CHannel), and the paging information itself is transmitted over a SCCPCH (Secondary Common Control Physical CHannel). Although the physical configuration is thus changed, the procedure of the mobile station of receiving the PI portion first, followed by receiving the paging information only when a decision is made that the paging occurs as a result of the PI reception, and the effect of the intermittent reception achieved by the procedure are identical to those of the "Specification of Air-Interface for 3G Mobile System Volume 3".

Thus, to select the best base station, it is necessary for each mobile station to always monitor the perch channels of the neighboring base stations by searching for and receiving them. On the other hand, the mobile station must reduce the duty ratio of its receiver to increase the life of the battery. Thus, there is an inevitable tradeoff between them. In other words, reducing the duty ratio of the receiver will bring about undesirable results such as prescribed service quality cannot be achieved because of the degradation in the accuracy of selecting the base station. In contrast with this, increasing the accuracy of selecting the base station by increasing the duty ratio of the receiver present an important problem of reducing the usefulness of the mobile station because of heavier consumption of its battery.

A document "Cell Selection Control in W-CDMA mobile station", by Yunoki, Higashi and Tsutsumi, 1999 IEICE General Conference B-5-186 estimates the effect of the intermittent reception. It suggests that the mobile station must carry out periodic search for the neighboring base stations in order to implement proper selection of the base station taking account of the movement of the mobile station. However, since it is unavoidable for the periodic search for the neighboring base stations to determine such a search period that can achieve a certain level of the intermittent reception effect, a problem can arise in that the accuracy of selecting the base station is reduced in such conditions as the mobile station moves quickly or the propagation state changes sharply, because the search cannot follow such changes in those propagation environments. In contrast, in such conditions as the mobile station little moves or the propagation condition changes slowly, most of the perch channel search becomes needless, which presents a problem of wasting the battery of the mobile station.

SUMMARY OF THE INVENTION

The present invention is implemented to solve the foregoing problems. It is therefore an object of the present invention to provide a (peripheral) cell search control method of a mobile station capable reducing the consumption power with maintaining the accuracy of selecting a best base station.

FIG. 3 is a schematic diagram illustrating the operation of the present invention. As shown in this figure, consider a case in which a mobile station 312 moves along the arrow through areas covered by four base stations 311-1–311-4, and assume that the mobile station 312 captures the perch channels of the three base stations 311-1–311-3, but not the perch channel of the base stations 311-4. When the mobile station 312 is close to one of the base stations, at the start position, for example, it can receive the perch channel from the base stations 311-1 in a good condition. Accordingly, the need for searching for better base stations is low, and hence reducing the frequency of the search little affects the receiving quality. However, when the mobile station is close to a boundary between a plurality of cells, the need increases for switching to the perch channel of another better base station, and the probability also increases of receiving a perch channel of a new base station such as the base station 311-4 whose perch channel is not captured.

The received power (received level) of a perch channel is high when the mobile station is close to the base station, while it is low when the mobile station is at a cell periphery, that is, near a cell boundary between a plurality of cells. When the mobile station is close to one of the base stations, since the received power of the perch itself is high, and the probability is low of receiving interference from perches of other stations, the received SIR (Signal to Interference power Ratio) of the perch channel is high. On the contrary, when the mobile station is at the cell periphery, that is, near the cell boundary between a plurality of cells, since the received power itself of the perch channels is low, and the probability is high of receiving interference from perches of other base stations, the received SIR of the perch channels is low. Although such a relationship between the received SIR and the location of the mobile station holds regardless of the radio access systems, the relationship is particularly distinct in CDMA (Code Division Multiple Acess) cellular systems because the base stations use the same radio frequency and operate under incessant interference.

On the other hand, the propagation loss, which is calculated from the received power of the perch channel and from the transmission power obtained by decoding the perch channel, is low near the base station, and is high at the cell periphery, that is, near the cell boundary between the plurality of cells.

In addition, when the mobile station controls its transmission power such that the base station can receive the transmitted signal at a certain quality (in terms of the received power or received SIR), the transmission power is low near the base station and increases at the cell periphery, that is, near the cell boundary between the plurality of cells.

Therefore, considering the highest received power, highest received SIR, minimum propagation loss or lowest transmission power enables the mobile station to recognize whether it is near the base station or far from it (at cell periphery).

Furthermore, comparing the perch channel with the highest received power with the perch channel with the second highest, the ratio of the second highest to the highest received power (=second highest received power/highest received power) is low near the base station, but is high at the cell periphery, that is, near the cell boundary of the plurality of cells, which holds true for the received SIR. In contrast, as for the propagation loss, the ratio of the second minimum propagation loss to the minimum propagation loss is large near the base station.

Besides, the number of perches with received power whose ratio to the highest received power is greater than a predetermined value is small near the base station because the highest received power is by far the greatest, whereas it is large at the cell periphery, that is, near the cell boundary of the plurality of cells because of receiving many perch channels at nearly the same received power, which also holds for the received SIR. As for the propagation loss, the number of perch channels with the propagation loss whose ratio to the minimum propagation loss is less than a predetermined value will be smaller near the base stations.

In view of the foregoing, the present invention automatically makes a decision as to whether the mobile station is at the cell periphery at which the need for searching for a new perch channel is large, or near the base station at which the need is little, and increases the search frequency at a location of the large need, and reduces it at a location of the little need.

Moreover, since the temporal fluctuations in the received level of the perch channels increase with the moving speed of the mobile station, the frequency of appearing new perch channels increases, while it is low when the mobile station moves little. Considering this, the present invention also detects the moving speed of the mobile station to change the search frequency of the new perch channels: increases it when the need for searching is great; and decreases when the need is small.

In the first aspect of the present invention, there is provided a cell search control method by which a mobile station searches for a perch channel transmitted by a base station to capture and receive the perch channel, and determines which base station to communicate with or to be standby for, the cell search control method comprising:

a measuring step of measuring receiving quality of a currently captured perch channel; and a control step of determining a frequency of searching for a new perch channel in response to the receiving quality measured by the measuring step.

Here, the measuring step may measure received power of the currently captured perch channel; and the control step may control the frequency of searching for a new perch channel in response to the highest received power measured by the measuring step such that when the highest received power is high, the frequency of searching for a new perch channel is low, whereas when the highest received power is low, the frequency of searching for a new perch channel is high.

The measuring step may measure received power of the currently captured perch channel; and the control step may control the frequency of searching for a new perch channel in response to the ratio of the second highest received power to the highest received power measured by the measuring step such that when the ratio is high, the frequency of searching for a new perch channel is high, whereas when the ratio is low, the frequency of searching for a new perch channel is low.

The measuring step may measure received power of the currently captured perch channel; and the control step may control the frequency of searching for a new perch channel in response to the number of perch channels with received power whose ratio to the highest received power measured by the measuring step is greater than a predetermined value such that when the number of perch channels is great, the frequency of searching for a new perch channel is high, whereas when the number of perch channels is small, the frequency of searching for a new perch channel is low.

The measuring step may measure a received SIR of the currently captured perch channel; and the control step may control the frequency of searching for a new perch channel in response to the highest received SIR measured by the measuring step such that when the highest received SIR is high, the frequency of searching for a new perch channel is low, whereas when the highest received SIR is low, the frequency of searching for a new perch channel is high.

The measuring step may measure a received SIR of the currently captured perch channel; and the control step may control the frequency of searching for a new perch channel in response to the ratio of the second highest received SIR to the highest received SIR measured by the measuring step such that when the ratio is high, the frequency of searching for a new perch channel is high, whereas when the ratio is low, the frequency of searching for a new perch channel is low.

The measuring step may measure a received SIR of the currently captured perch channel; and the control step may control the frequency of searching for a new perch channel in response to the number of perch channels with a received SIR whose ratio to the highest received SIR measured by the measuring step is greater than a predetermined value such that when the number of perch channels is great, the frequency of searching for a new perch channel is high, whereas when the number of perch channels is small, the frequency of searching for a new perch channel is low.

The cell search control method may further comprise:

an extracting step of decoding a received perch channel, and extracting transmission power information, the perch channel including its own transmission power information, wherein the measuring step measures received power of a currently captured perch channel; and the control step obtains a propagation loss between the mobile station and a base station that transmits the perch channel from the received power measured by the measuring step and the transmission power of the perch channel with the received power extracted by the extracting step, and controls the frequency of searching for a new perch channel in response to the minimum propagation loss obtained such that when the minimum propagation loss is high, the frequency of searching for a new perch channel is high, whereas when the minimum propagation loss is low, the frequency of searching for a new perch channel is low.

The cell search control method may further comprise:

an extracting step of decoding a received perch channel, and extracting transmission power information, the perch channel including its own transmission power information, wherein the measuring step measures received power of a currently captured perch channel; and the control step obtains a propagation loss between the mobile station and a base station that transmits the perch channel from the received power measured by the measuring step and the transmission power of the perch channel with the received power extracted by the extracting step, and controls the frequency of searching for a new perch channel is response to the ratio of the second minimum propagation loss to the minimum propagation loss obtained such that when the ratio is low, the frequency of searching for a new perch channel is high, whereas when the ratio is high, the frequency of searching for a new perch channel is low.

The cell search control method may further comprise:

an extracting step of decoding a received perch channel, and extracting transmission power information, the perch channel including its own transmission power information, wherein the measuring step measures received power of a currently captured perch channel; and the control step obtains a propagation loss between the mobile station and a base station that transmits the perch channel from the received power measured by the measuring step and the transmission power of the perch channel with the received power extracted by the extracting step, and controls the frequency of searching for a new perch channel in response to the number of perch channels with a propagation loss whose ratio to the minimum propagation loss obtained is less than a predetermined value such that when the number of the perch channels is great, the frequency of searching for a new perch channel is high, whereas when the number of the perch channels is small, the frequency of searching for a new perch channel is low.

In the second aspect of the present invention, there is provided a cell search control method by which a mobile station searches for a perch channel transmitted by a base station to capture and receive the perch channel, and determines which base station to communicate with or to be standby for, the cell search control method comprising:

a measuring step of measuring transmission power of a signal to be transmitted to the base station that the mobile station currently communicate with or is currently standby for; and a control step of controlling a frequency of searching for a new perch channel in response to the lowest transmission power measured by the measuring step such that when the lowest transmission power is high, the frequency of searching for a new perch channel is high, whereas when the lowest transmission power is low, the frequency of searching for a new perch channel is low.

In the third aspect of the present invention, there is provided a cell search control method by which a mobile station searches for a perch channel transmitted by a base station to capture and receive the perch channel, and determines which base station to communicate with or to be standby for, the cell search control method comprising:

a detecting step of detecting a moving speed of the mobile station; and a controlling step of controlling a frequency of searching for a new perch channel in response to the moving speed detected by the detecting step such that when the moving speed is high, the frequency of searching for a new perch channel is high, whereas when the moving speed is low, the frequency of searching for a new perch channel is low.

In the fourth aspect of the present invention, there is provided a mobile station which searches for a perch channel transmitted by a base station to capture and receive the perch channel, and determines which base station to communicate with or to be standby for, the mobile station comprising:

measuring means for measuring receiving quality of a currently captured perch channel; and control means for determining a frequency of searching for a new perch channel in response to the receiving quality measured by the measuring means.

Here, the measuring means may measure received power of the currently captured perch channel; and the control means may control the frequency of searching for a new perch channel in response to the highest received power measured by the measuring means such that when the highest received power is high, the frequency of searching for a new perch channel is low, whereas when the highest received power is low, the frequency of searching for a new perch channel is high.

The measuring means may measure received power of the currently captured perch channel; and the control means may control the frequency of searching for a new perch channel in response to the ratio of the second highest received power to the highest received power measured by the measuring means such that when the ratio is high, the frequency of searching for a new perch channel is high, whereas when the ratio is low, the frequency of searching for a new perch channel is low.

The measuring means may measure received power of the currently captured perch channel; and the control means may control the frequency of searching for a new perch channel in response to the number of perch channels with received power whose ratio to the highest received power measured by the measuring means is greater than a predetermined value such that when the number of perch channels is great, the frequency of searching for a new perch channel is high, whereas when the number of perch channels is small, the frequency of searching for a new perch channel is low.

The measuring means may measure a received SIR of the currently captured perch channel; and the control means may control the frequency of searching for a new perch channel in response to the highest received SIR measured by the measuring means such that when the highest received SIR is high, the frequency of searching for a new perch channel is low, whereas when the highest received SIR is low, the frequency of searching for a new perch channel is high.

The measuring means may measure a received SIR of the currently captured perch channel; and the control means may control the frequency of searching for a new perch channel in response to the ratio of the second highest received SIR to the highest received SIR measured by the measuring means such that when the ratio is high, the frequency of searching for a new perch channel is high, whereas when the ratio is low, the frequency of searching for a new perch channel is low.

The measuring means may measure a received SIR of the currently captured perch channel; and the control means may control the frequency of searching for a new perch channel in response to the number of perch channels with a received SIR whose ratio to the highest received SIR measured by the measuring means is greater than a predetermined value such that when the number of perch channels is great, the frequency of searching for a new perch channel is increased, whereas when the number of perch channels is small, the frequency of searching for a new perch channel is low.

The mobile station may further comprise:

extracting means for decoding a received perch channel, and for extracting transmission power information, the perch channel including its own transmission power information, wherein the measuring means measures received power of a currently captured perch channel; and the control means obtains a propagation loss between the mobile station and a base station that transmits the perch channel from the received power measured by the measuring means and the transmission power of the perch channel with the received power extracted by the extracting means, and controls the frequency of searching for a new perch channel in response to the minimum propagation loss obtained such that when the minimum propagation loss is high, the frequency of searching for a new perch channel is high, whereas when the minimum propagation loss is low, the frequency of searching for a new perch channel is low.

The mobile station may further comprise:

extracting means for decoding a received perch channel, and for extracting transmission power information, the perch channel including its own transmission power information, wherein the measuring means measures received power of a currently captured perch channel; and the control means obtains a propagation loss between the mobile station and a base station that transmits the perch channel from the received power measured by the measuring means and the transmission power of the perch channel with the received power extracted by the extracting means, and controls the frequency of searching for a new perch channel in response to the ratio of the second minimum propagation loss to the minimum propagation loss obtained such that when the ratio is low, the frequency of searching for a new perch channel is high, whereas when the ratio is high, the frequency of searching for a new perch channel is low.

The mobile station may further comprise:

extracting means for decoding a received perch channel, and for extracting transmission power information, the perch channel including its own transmission power information, wherein the measuring means measures received power of a currently captured perch channel; and the control means obtains a propagation loss between the mobile station and a base station that transmits the perch channel from the received power measured by the measuring means and the transmission power of the perch channel with the received power extracted by the extracting means, and controls the frequency of searching for a new perch channel in response to the number of perch channels with a propagation loss whose ratio to the minimum propagation loss obtained is less than a predetermined value such that when the number of the perch channels is great, the frequency of searching for a new perch channel is high, whereas when the number of the perch channels is small, the frequency of searching for a new perch channel is low.

The mobile station may monitor paging to itself by intermittent reception in a standby mode.

In the fifth aspect of the present invention, there is provided a mobile station which searches for a perch channel transmitted by a base station to capture and receive the perch channel, and determines which base station to communicate with or to be standby for, the mobile station comprising:

measuring means for measuring transmission power of a signal to be transmitted to the base station that the mobile station currently communicate with or is currently standby for; and control means for controlling a frequency of searching for a new perch channel in response to the lowest transmission power measured by the measuring means such that when the lowest transmission power is high, the frequency of searching for a new perch channel is high, whereas when the lowest transmission power is low, the frequency of searching for a new perch channel is low.

Here, the mobile station may monitor paging to itself by intermittent reception in a standby mode.

In the sixth aspect of the present invention, there is provided a mobile station which searches for a perch channel transmitted by a base station to capture and receive the perch channel, and determines which base station to communicate with or to be standby for, the mobile station comprising:

detecting means for detecting a moving speed of the mobile station; and control means for controlling a frequency of searching for a new perch channel in response to the moving speed detected by the detecting means such that when the moving speed is high, the frequency of searching for a new perch channel is high, whereas when the moving speed is low, the frequency of searching for a new perch channel is low.

Here, the mobile station may monitor paging to itself by intermittent reception in a standby mode.

In the seventh aspect of the present invention, there is provided a mobile communications system including a plurality of base stations and a mobile station which searches for perch channels transmitted by the plurality of base stations to capture and receive the perch channels, and determines which base station to communicate with or to be standby for, the mobile station comprising:

measuring means for measuring receiving quality of a currently captured perch channel; and control means for determining a frequency of searching for a new perch channel in response to the receiving quality measured by the measuring means.

In the eighth aspect of the present invention, there is provided a mobile communications system including a plurality of base stations and a mobile station which searches for perch channels transmitted by the plurality of base stations to capture and receive the perch channels, and determines which base station to communicate with or to be standby for, the mobile station comprising:

measuring means for measuring transmission power of a signal to be transmitted to the base station that the mobile station currently communicate with or is currently standby for; and control means for controlling a frequency of searching for a new perch channel in response to the lowest transmission power measured by the measuring means such that when the lowest transmission power is high, the frequency of searching for a new perch channel is high, whereas when the lowest transmission power is low, the frequency of searching for a new perch channel is low.

In the ninth aspect of the present invention, there is provided a mobile communications system including a plurality of base stations and a mobile station which searches for perch channels transmitted by the plurality of base stations to capture and receive the perch channels, and determines which base station to communicate with or to be standby for, the mobile station comprising:

detecting means for detecting a moving speed of the mobile station; and control means for controlling a frequency of searching for a new perch channel in response to the moving speed detected by the detecting means such that when the moving speed is high, the frequency of searching for a new perch channel is high, whereas when the moving speed is low, the frequency of searching for a new perch channel is low.

The foregoing configurations make it possible for the cell search control method in the mobile station to save the consumption power with maintaining the accuracy of selecting the best base station.

The above and other objects, effects, features and advantages of the present invention will become more apparent from the following description of embodiments thereof taken in conjunction with the accompanying drawings.

BRIEF DESCRIPTION OF THE DRAWINGS

FIG. 5 is a table showing an example of data stored in a memory of the embodiment 1 in accordance with the present invention;

DETAILED DESCRIPTION OF THE PREFERRED EMBODIMENTS

The invention will now be described with reference to the accompanying drawings.

Embodiment 1

Figure 1:
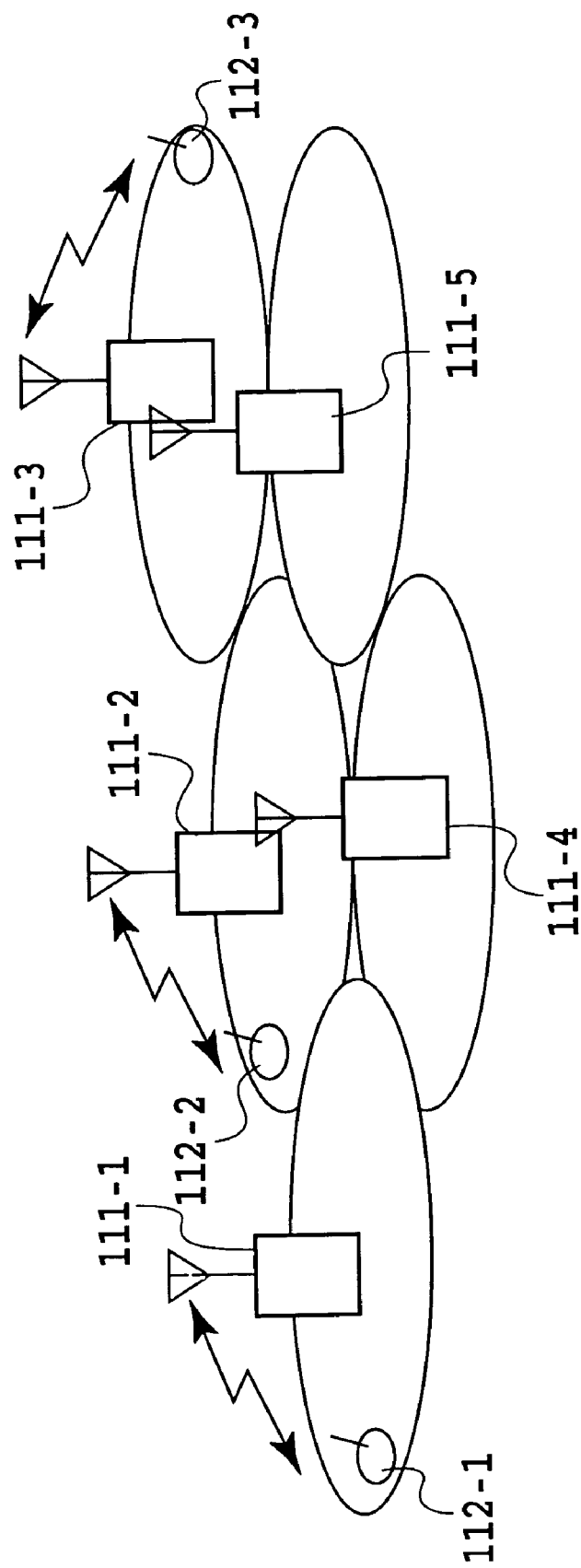
FIG. 1 is a diagram showing an example of a mobile communications system.
Figure 2:
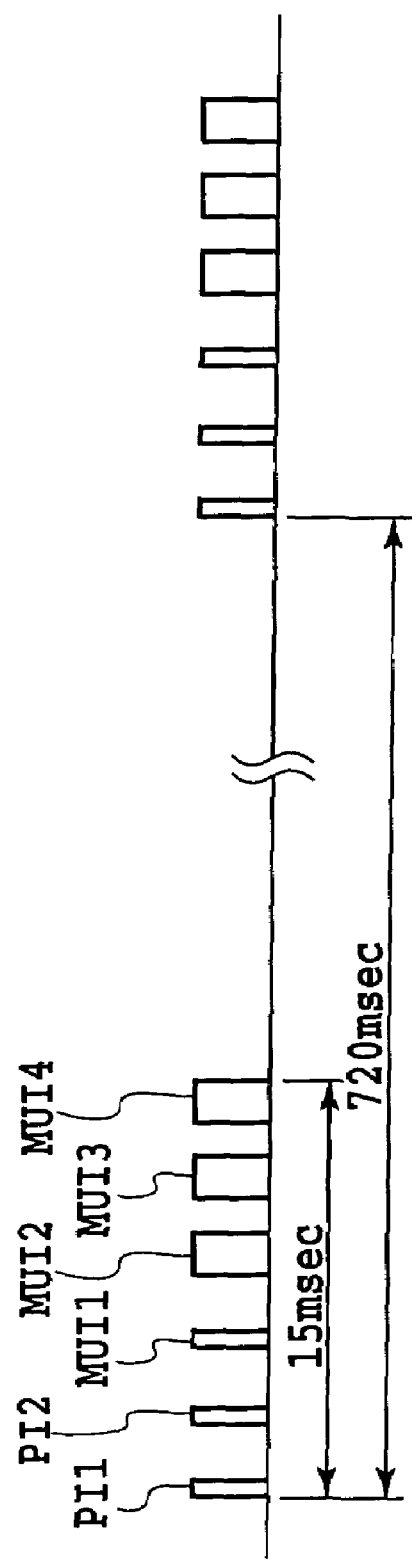
FIG. 2 is a schematic diagram illustrating the structure of a paging channel.
Figure 3:
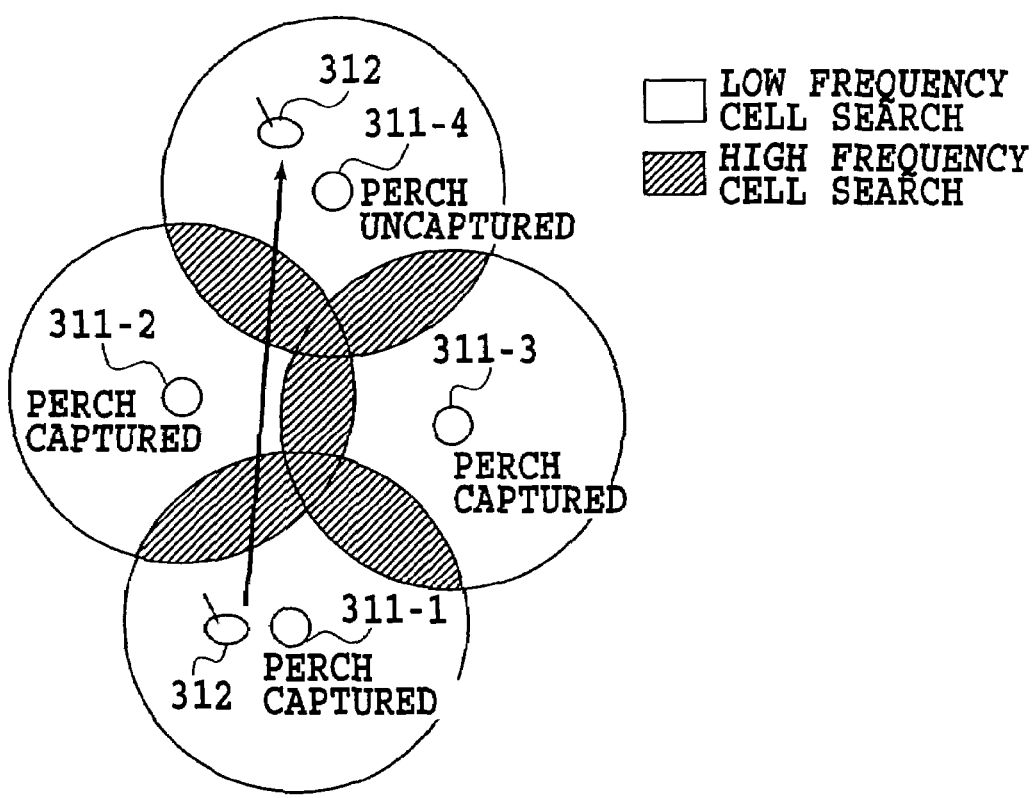
FIG. 3 is a schematic diagram illustrating an operation of the present invention.
Figure 4:
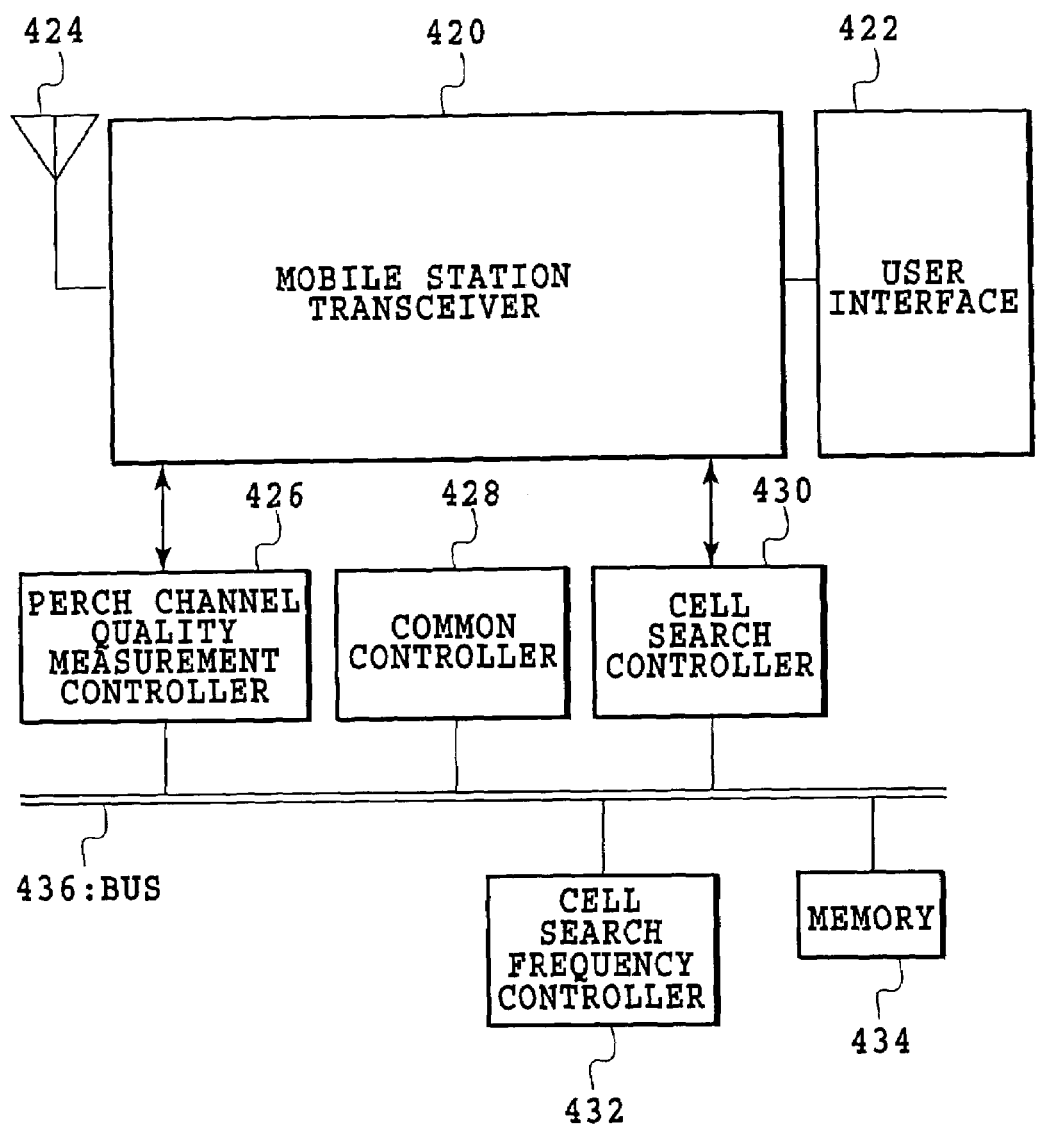
FIG. 4 is a block diagram showing an embodiment 1 of the mobile station in accordance with the present invention.

FIG. 4 is a block diagram showing an embodiment 1 of a mobile station in accordance with the present invention, which shows only portions of the mobile station associated with the present invention. The present embodiment 1 of the mobile station comprises a mobile station transceiver 420, a user interface 422, an antenna 424, a perch channel quality measurement controller 426, a common controller 428, a cell search controller 430, a cell search frequency controller 432, a memory 434, and a bus 436. The present embodiment 1 of the mobile station searches for perch channels transmitted by base stations, captures and receives them, and decides which base station to communicate with or to be standby for. In the standby mode, the mobile station monitors paging to itself by means of intermittent reception.

The mobile station transceiver 420 demodulates user information and a control signal which are modulated and transmitted by the base stations, and codes and modulates a user signal and a control signal. Although the mobile station transceiver 420 differs depending on its access scheme such as FDMA (Frequency Division Multiple Access), TDMA (Time Division Multiple Access) or CDMA (Code Division Multiple Access), the difference in the modulation and demodulation schemes in the radio section have nothing to do with the effect of the present invention. The mobile station transceiver 420 is connected with the antenna 424 and user interface 422. The common controller 428 carries out overall control of the mobile station. The perch channel quality measurement controller 426 instructs the mobile station transceiver 420 to carry out the quality measurement of the perch channels, and obtains the results of the measurement. The cell search controller 430 instructs the mobile station transceiver 420 to carry out the cell search, and obtains the results of the cell search. The cell search frequency controller 432 controls the cell search in response to the results of the quality measurement of the perch channels. The memory 434 stores various data. The bus 436 interconnects the common controller 428, perch channel quality measurement controller 426, cell search controller 430, cell search frequency controller 432 and memory 434.

Figure 5:
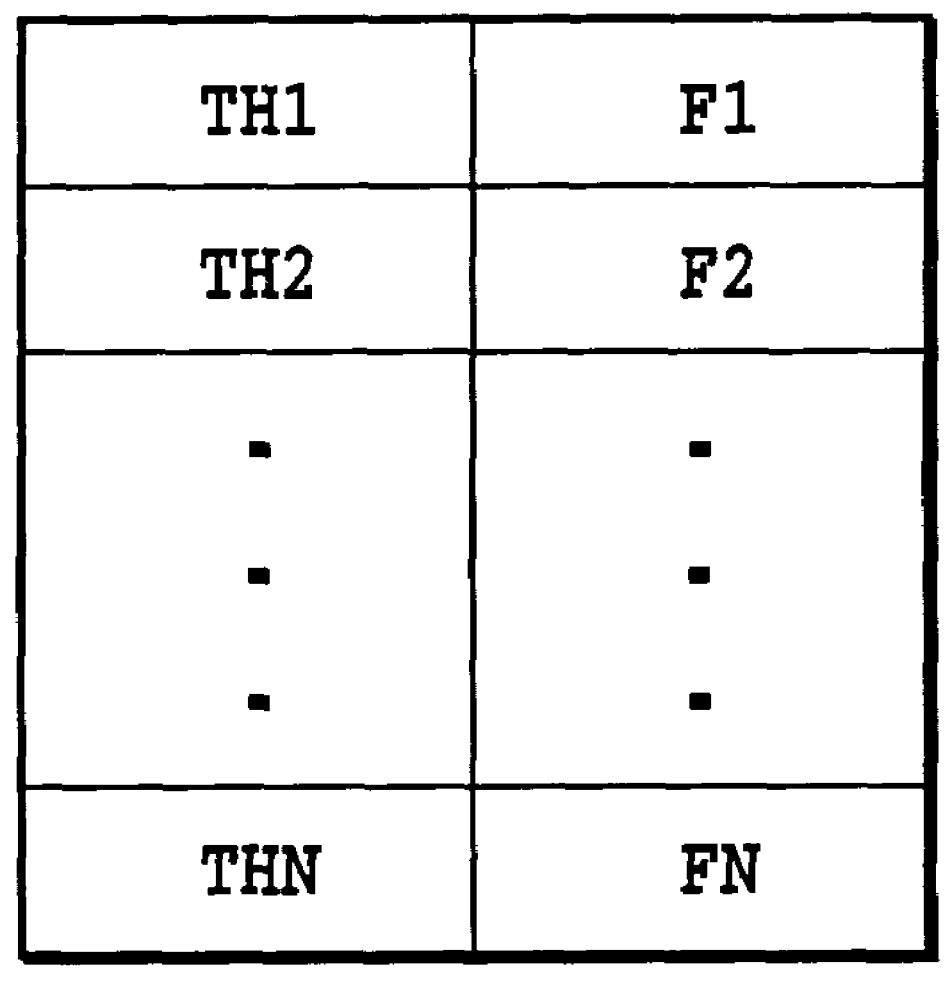

FIG. 5 is a table showing an example of data stored in the memory 434 of the present embodiment. In this table, symbols TH1, TH2, . . . , and THN each designate a threshold value to be compared with the measured quality of the perch channels. For example, the threshold values consist of values to be compared with one of the following: the highest received power of the (currently captured) perch channels; the ratio of the second highest to the highest received power of the perch channels; the number of perch channels with received power whose ratio to the highest received power is greater than a predetermined value; the highest received SIR of the perch channels; the ratio of the second highest to the highest received SIR of the perch channels; the number of perch channels with a received SIR whose ratio to the highest received SIR is greater than a predetermined value; and minimum propagation loss between the mobile station and the base stations; the ratio of the second minimum to the minimum propagation loss between the mobile station and the base stations; and the number of the perch channels (base stations) with a propagation loss whose ratio to the minimum propagation loss between the mobile station and the base stations is less than the predetermined value. The symbols F1, F2, . . . , and FN each denote a parameter indicating a cell search frequency (frequency of searching for a new perch channel) determined for the individual threshold values.

When the threshold values TH1, TH2, . . . , and THN are associated with the highest received power of the perch channel, the cell search frequencies F1, F2, . . . , and FN are set in such a manner that when the highest received power is high, the cell search frequency is low, whereas when the highest received power is low, the cell search frequency is high.

When the threshold values TH1, TH2, . . . , and THN are associated with the ratio of the second highest to the highest received power of the perch channels, the cell search frequencies F1, F2, . . . , and FN are set in such a manner that when the ratio is high, the cell search frequency is high, whereas when the ratio is low, the cell search frequency is low.

When the threshold values TH1, TH2, . . . , and THN are associated with the number of perch channels with received power whose ratio to the highest received power is greater than a predetermined value, the cell search frequencies F1, F2, . . . , and FN are set in such a manner that when the number of perch channels is great, the cell search frequency is high, whereas when the number of perch channels is small, the cell search frequency is low.

When the threshold values TH1, TH2, . . . , and THN are associated with the highest received SIR of the perch channel, the cell search frequencies F1, F2, . . . , and FN are set in such a manner that when the highest received SIR is high, the cell search frequency is low, whereas when the highest received SIR is low, the cell search frequency is high.

When the threshold values TH1, TH2, . . . , and THN are associated with the ratio of the second highest to the highest received SIR of the perch channels, the cell search frequencies F1, F2, . . . , and FN are set in such a manner that when the ratio is high, the cell search frequency is high, whereas when the ratio is low, the cell search frequency is low.

When the threshold values TH1, TH2, . . . , and THN are associated with the number of perch channels with a received SIR whose ratio to the highest received SIR is greater than a predetermined value, the cell search frequencies F1, F2, . . . , and FN are set in such a manner that when the number of perch channels is great, the cell search frequency is high, whereas when the number of perch channels is small, the cell search frequency is low.

When the threshold values TH1, TH2, . . . , and THN are associated with the minimum propagation loss between the mobile station and the base stations, the cell search frequencies F1, F2, . . . , and FN are set in such a manner that when the minimum propagation loss is high, the cell search frequency is high, whereas when the minimum propagation loss is low, the cell search frequency is low.

When the threshold values TH1, TH2, . . . , and THN are associated with the ratio of the second minimum to the minimum propagation loss between the mobile station and the base stations, the cell search frequencies F1, F2, . . . , and FN are set in such a manner that when the ratio is low, the cell search frequency is high, whereas when the ratio is high, the cell search frequency is low.

When the threshold values TH1, TH2, . . . , and THN are associated with the number of perch channels with the propagation loss whose ratio to the minimum propagation loss between the mobile station and the base stations is less than a predetermined value, the cell search frequencies F1, F2, . . . , and FN are set in such a manner that when the number of the perch channels is great, the cell search frequency is high, whereas when the number of the perch channels is small, the cell search frequency is low.

Figure 6:
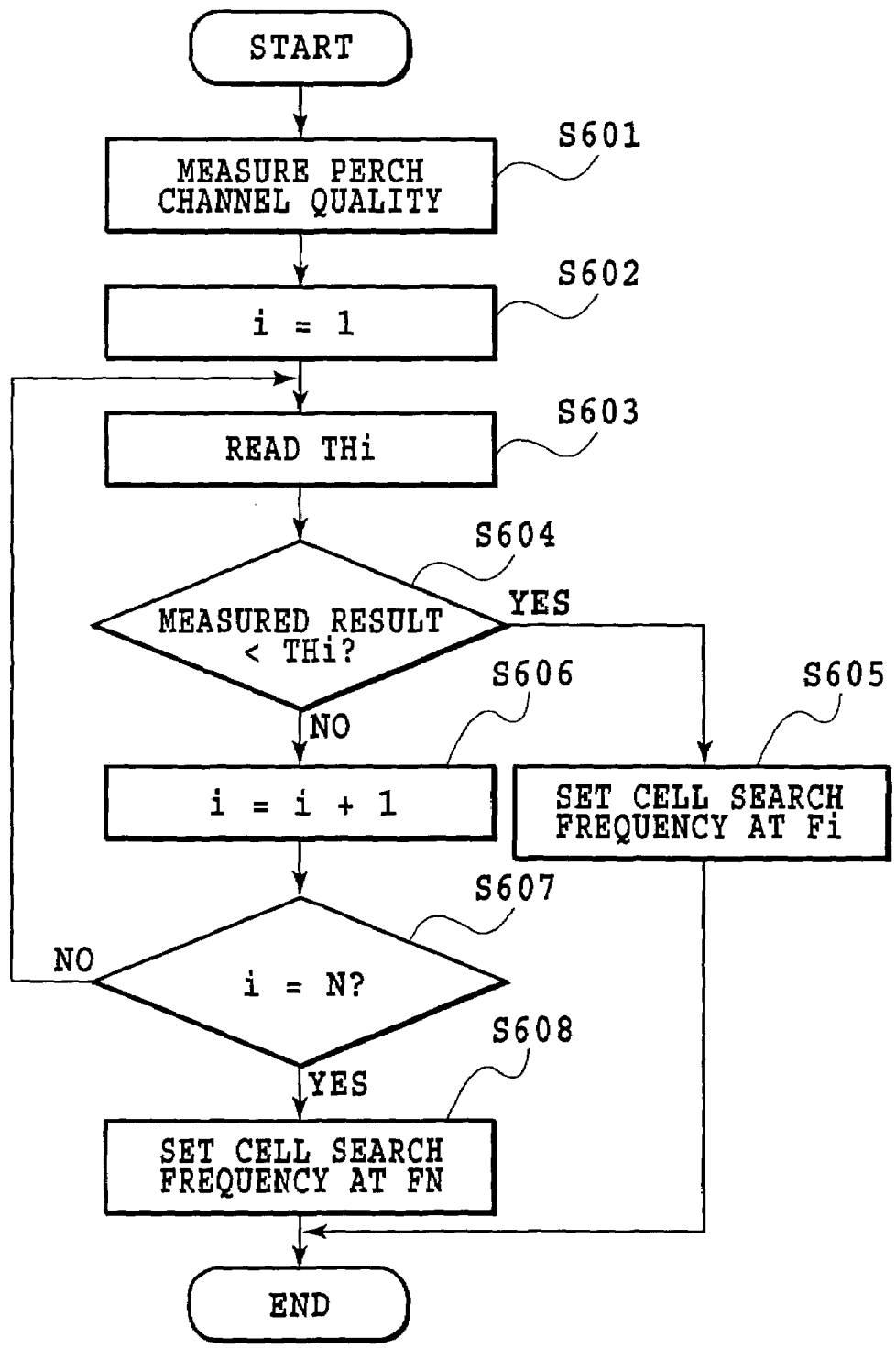
FIG. 6 is a flowchart illustrating a processing of controlling a cell search frequency of the embodiment 1 in accordance with the present invention.

FIG. 6 is a flowchart illustrating a processing of controlling the cell search frequency of the present embodiment 1. The perch channel quality measurement controller 426 instructs the mobile station transceiver 420 to measure the quality (such as received power) of each of the currently captured perch channels, and stores the results into the memory 434 (step S601). For example, when deciding the cell search frequency in response to the highest value of the measured received powers, the perch channel quality measurement controller 426 stores only the highest value into the memory 434 to be used in a subsequent comparison (S604). The cell search frequency controller 432 initializes a loop variable i to one (S602), and reads the threshold value TH1 from the memory 434 (S603). It compares the measured result (measured quality) with TH1 (S604), sets the cell search frequency at F1 when the measured result is less than TH1 (S605), or otherwise it increments i by one (S606), and returns to step S603 to repeat the same processing unless i=N (S607). When i=N (S607), it sets the cell search frequency at FN (S608).

When using the propagation losses between the mobile station and the base stations as the receiving quality, the base stations transmit the power information (transmission power information) of the perch channels to the mobile station over the perch channels. Then, the mobile station measures the received power of the perch channels at step S601, decodes the perch channels, extracts the transmission power information, and obtains the propagation losses from the received power and the transmission power.

Embodiment 2

Figure 7:
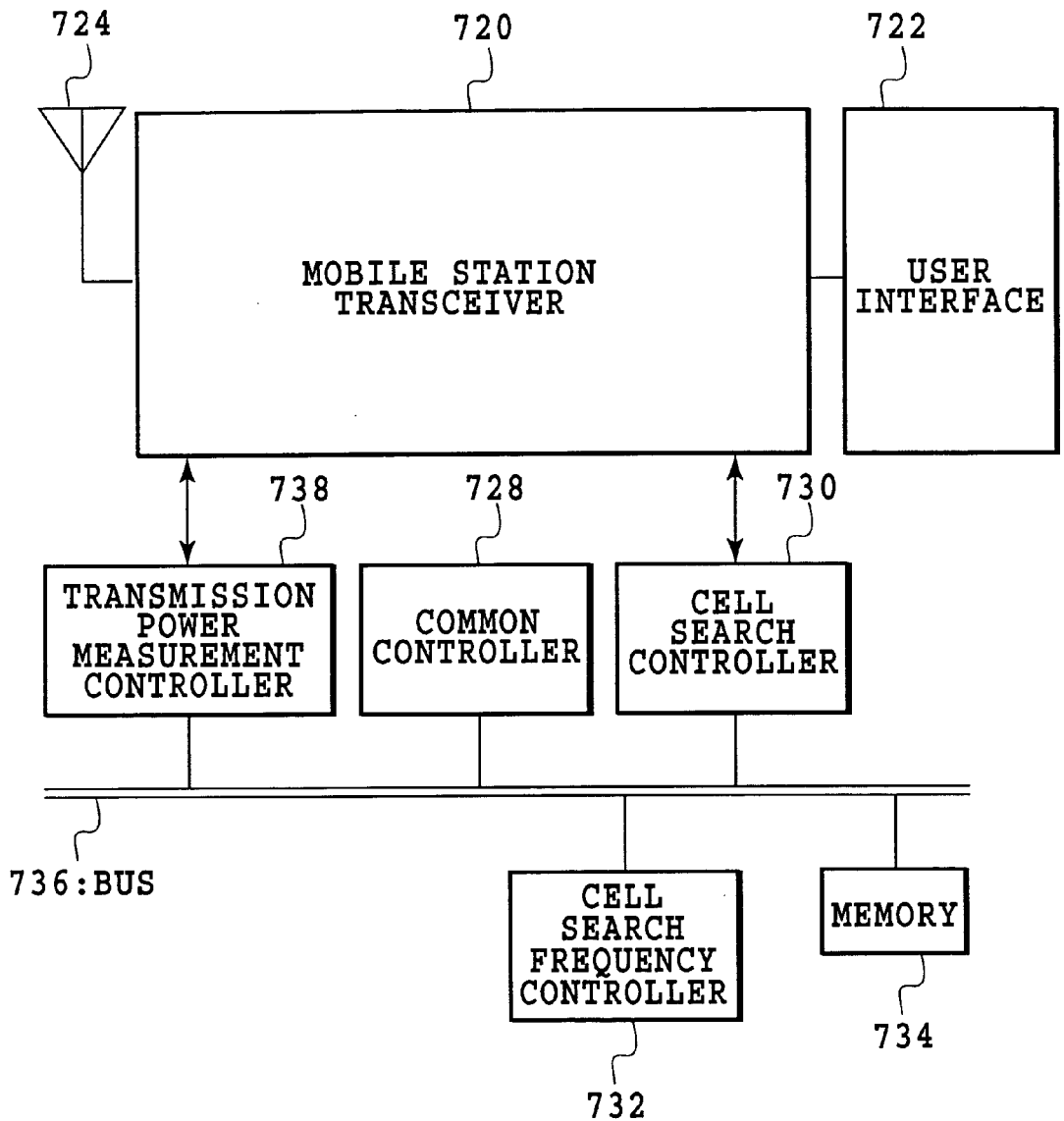
FIG. 7 is a block diagram showing an embodiment 2 of the mobile station in accordance with the present invention.

FIG. 7 is a block diagram showing a configuration of an embodiment 2 of the mobile station in accordance with the present invention, which shows only portions of the mobile station associated with the present invention. The present embodiment 2 of the mobile station comprises a mobile station transceiver 720, a user interface 722, an antenna 724, a transmission power measurement controller 738, a common controller 728, a cell search controller 730, a cell search frequency controller 732, a memory 734 and a bus 736. The present embodiment 2 of the mobile station searches for perch channels transmitted by base stations, captures and receives them and determines which base station to communicate with or to be standby for. Besides, in the standby mode, it monitors the paging to itself by the intermittent reception.

The mobile station transceiver 720 demodulates the user information and control signal which are radio modulated and transmitted by the base station, and codes and modulates a user signal and a control signal which are transmitted by the mobile station. The mobile station transceiver 720 is connected with the antenna 724 and user interface 722. The common controller 728 carries out overall control of the mobile station. The transmission power measurement controller 738 instructs the mobile station transceiver 720 to measure the transmission power of the signal to be transmitted to the base station that the mobile station currently communicate with or is currently standby for, and obtains the measured result. The cell search controller 730 instructs the mobile station transceiver 720 to carry out the cell search, and obtains the cell search result. The cell search frequency controller 732 controls the frequency for carrying out the cell search in response to the measured result of the transmission power. The memory 734 stores various types of data. The bus 736 interconnects the common controller 728, transmission power measurement controller 738, cell search controller 730, cell search frequency controller 732 and memory 734.

The present embodiment 2 of the mobile station (mobile station transceiver 720) controls the signal transmission power such that the transmitted signal is received by the base station at a certain required quality level (received power or received SIR). The transmission power control is performed on the basis of the command transmitted from the base station.

The data content stored on the memory 734 is the same as that illustrated in FIG. 5. In the present embodiment 2, the threshold values TH1, TH2, . . . , and THN are compared with minimum measured transmission power (if there is only one base station that the mobile station currently communicate with or is currently standby for, and transmission power is measured for only the signal that is transmitted to that base station, then that transmission power is used as minimum measured transmission power). The cell search frequencies F1, F2, . . . , and FN are set in such a manner that when the lowest transmission power is high, the cell search frequency is high, whereas when the lowest transmission power is low, the cell search frequency is low.

Figure 8:
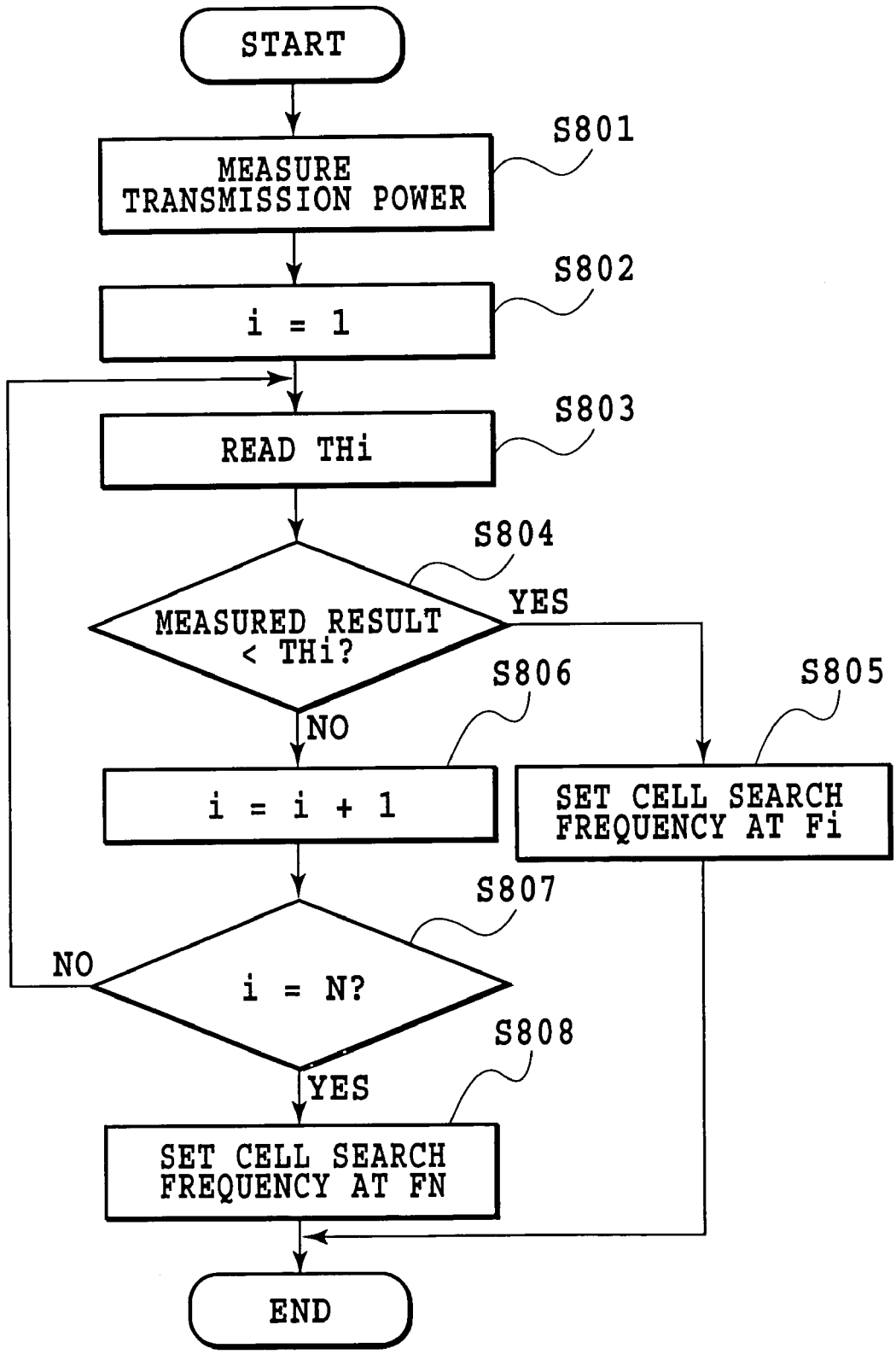
FIG. 8 is a flowchart illustrating a processing of controlling a cell search frequency of the embodiment 2 in accordance with the present invention.

FIG. 8 is a flowchart illustrating a processing of controlling the cell search frequency of the present embodiment 2. The flow of FIG. 8 is similar to that of FIG. 6. In the present embodiment 2, the transmission power is measured at step S801, and the cell search frequency is determined through steps S802–S808.

Embodiment 3

Figure 9:
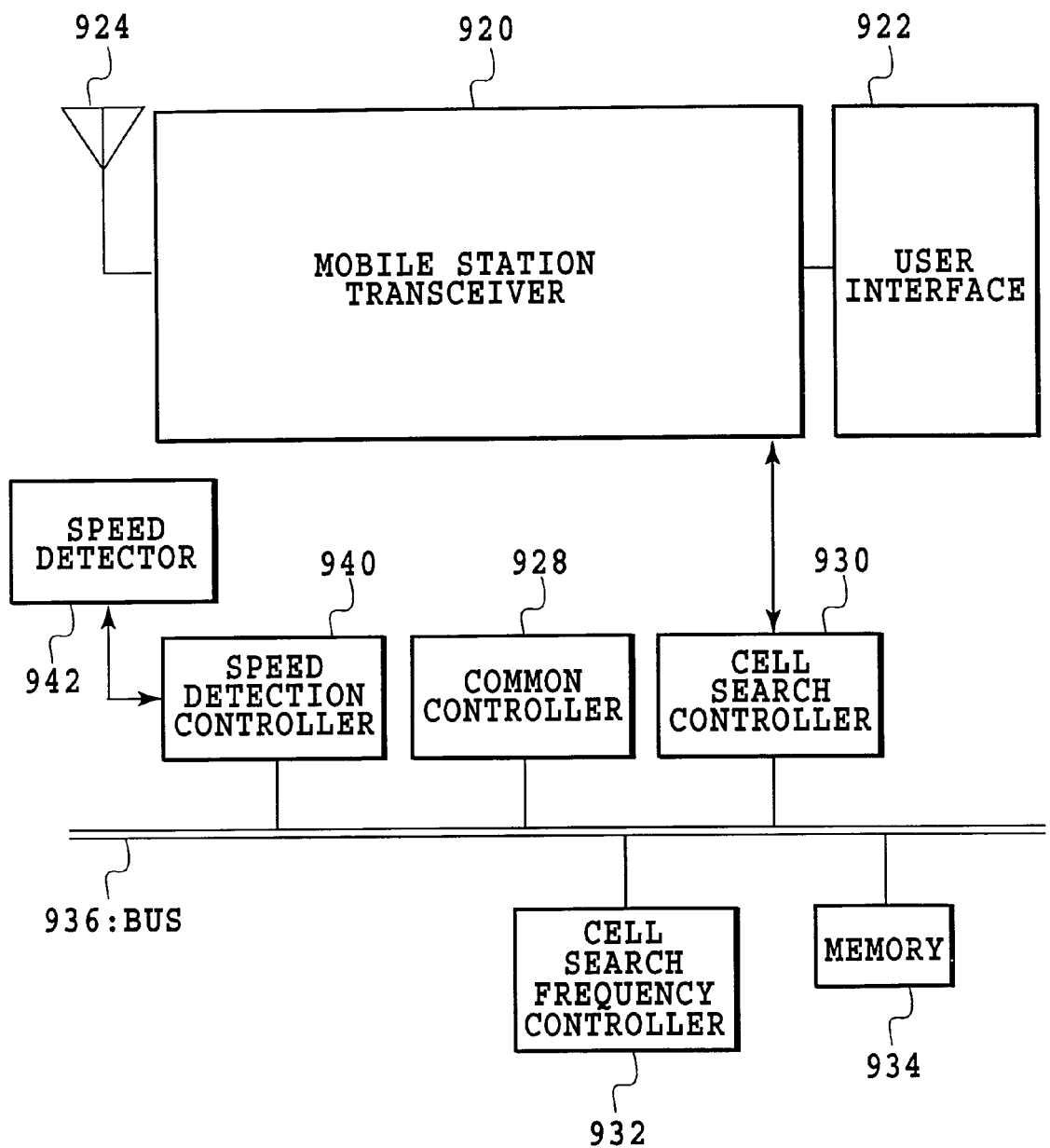
FIG. 9 is a block diagram showing an embodiment 3 of the mobile station in accordance with the present invention.

FIG. 9 is a block diagram showing a configuration of an embodiment 3 of the mobile station in accordance with the present invention, which shows only portions of the mobile station associated with the present invention. The present embodiment 3 of the mobile station comprises a mobile station transceiver 920, a user interface 922, an antenna 924, a speed detection controller 940, a speed detector 942, a common controller 928, a cell search controller 930, a cell search frequency controller 932, a memory 934 and a bus 936. The present embodiment 3 of the mobile station searches for perch channels transmitted by base stations, captures and receives them and determines which base station to communicate with or to be standby for. Besides, in the standby mode, it monitors the paging to itself by the intermittent reception.

The mobile station transceiver 920 demodulates the user information and a control signal which are radio modulated and transmitted by the base station, and codes and modulates a user signal and a control signal which are transmitted by the mobile station. The mobile station transceiver 920 is connected with the antenna 924 and user interface 922. The speed detector 942 detects the moving speed of the mobile station. There are various methods of detecting the moving speed such as using a speedometer of a vehicle; detecting the fading pitch of the received signal; using a pedometer etc. The effect of the present invention, however, has nothing to do with the methods of detecting the moving speed. The common controller 928 carries out overall control of the mobile station. The speed detection controller 940 instructs the speed detector 942 to measure the current moving speed of the mobile station, and obtains the measured result. The cell search controller 930 instructs the mobile station transceiver 920 to carry out the cell search, and obtains the cell search results. The cell search frequency controller 932 controls the frequency for carrying out the cell search in response to the measured result of the moving speed. The memory 934 stores various types of data. The bus 936 interconnects the common controller 928, speed detection controller 940, cell search controller 930, cell search frequency controller 932 and memory 934.

The data content stored on the memory 934 is the same as that illustrated in FIG. 5. In the present embodiment 3, the threshold values TH1, TH2, . . . , and THN are compared with the moving speed detected. The cell search frequencies F1, F2, . . . , and FN are set in such a manner that when the moving speed is high, the cell search frequency is high, whereas when the moving speed is low, the cell search frequency is low.

Figure 10:
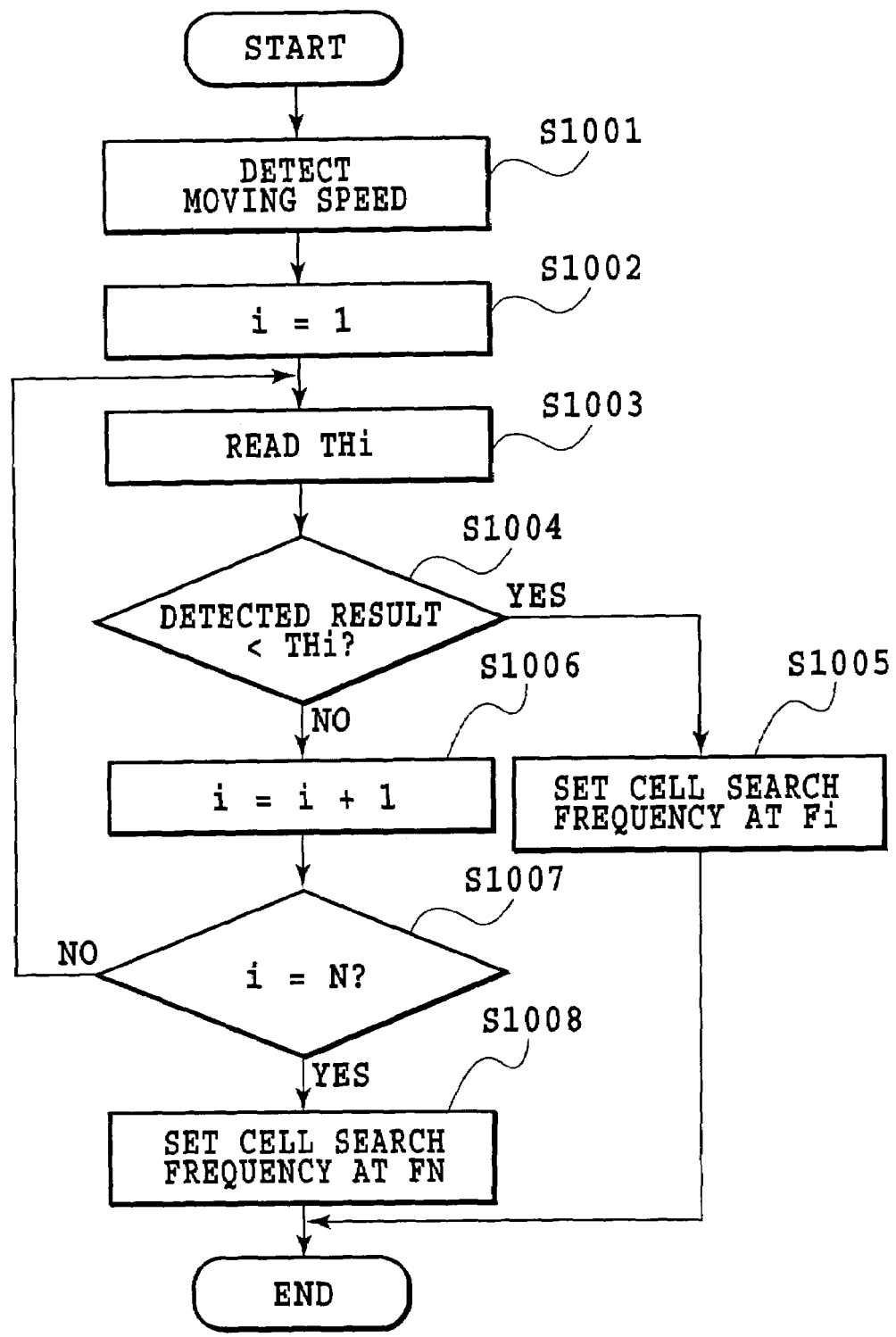
FIG. 10 is a flowchart illustrating a processing of controlling a cell search frequency of the embodiment 3 in accordance with the present invention.

FIG. 10 is a flowchart illustrating a processing of controlling the cell search frequency of the present embodiment 3. The flow of FIG. 10 is similar to that of FIG. 6. In the present embodiment 3, the moving speed is detected at step S1001, and the cell search frequency is determined through steps S1002–S1008.

As described above, according to the present invention, the mobile station measures the receiving quality of the currently captured perch channels of the base stations, or the transmission power of the signals transmitted to the base stations; automatically makes a decision as to whether the mobile station is located at the cell periphery in which the need for searching for a new perch channel is great, or located in neighborhood of the base stations in which the need is little; and increases the frequency of the search at a location where the need is great and decreases it at a location where the need is little. Here, the receiving quality of the perch channel includes the following: the highest received power; the ratio of the second highest received power to the highest received power; the number of perch channels with received power whose ratio to the highest received power is greater than a predetermined value; the highest received SIR; the ratio of the second highest received SIR to the highest received SIR; the number of perch channels with a received SIR whose ratio of the highest received SIR is greater than a predetermined value; the minimum propagation loss calculated from the perch received power and the transmission power obtained by decoding the perch channels; the ratio of the second minimum propagation loss to the minimum propagation loss; the number of perch channels with a propagation loss whose ratio to the minimum propagation loss is less than a predetermined value; and the like.

Alternatively, the mobile station detects its moving speed, and increases the frequency of the search when the frequency of the appearance of a new perch channel is high, while it decreases the frequency of the search when the frequency of appearance of a new perch channel is low.

In this way, the cell search control method in the mobile station can save the consumption power with maintaining the accuracy of selecting the best base station. More specifically, when the fluctuations in the receiving quality of the perch channel is sharp, the mobile station sets the frequency at high of searching for the perch channels to enable the receiving quality of the signal transmitted from the base station to the mobile station to be maintained at a high level, whereas when the fluctuations in the receiving quality of the perch channel is slow, the mobile station sets the frequency at low of searching for the perch channels to save the consumption power of the mobile station, offering an advantage of being able to increase the life of the battery.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A cell search control method by which a mobile station searches for a perch channel transmitted by a base station to capture and receive the perch channel, and determines which base station to communicate with or to be standby for, said cell search control method comprising:
   a measuring step of measuring a first receiving quality of each of a plurality of currently captured perch channels;
   an obtaining step of obtaining a second receiving quality from the first receiving qualities measured by said measuring step; and
   a control step of determining a degree of how frequent searches for new perch channels which are currently not captured are conducted in response to the second receiving quality obtained by said obtaining step.

2. The cell search control method as claimed in claim 1, wherein
   said measuring step measures a received power of each of the plurality of currently captured perch channels;
   said obtaining step obtains, with respect to the received powers measured by said measuring step, the highest received power; and
   said control step controls the degree of how frequent the searches for the new perch channels are conducted in response to the highest received power obtained by said obtaining step such that when the highest received power is high, the degree of how frequent the searches for the new perch channels are conducted is low, whereas when the highest received power is low, the degree of how frequent the searches for the new perch channels are conducted is high.

3. The cell search control method as claimed in claim 1, wherein
   said measuring step measures a received power of each of the plurality of currently captured perch channels;
   said obtaining step obtains, with respect to the received powers measured by said measuring step, the ratio of the second highest received power to the highest received power; and
   said control step controls the degree of how frequent the searches for the new perch channels are conducted in response to the ratio obtained by said obtaining step such that when the ratio is high, the degree of how frequent the searches for the new perch channels are conducted is high, whereas when the ratio is low, the degree of how frequent the searches for the new perch channels are conducted is low.

4. The cell search control method as claimed in claim 1, wherein
   said measuring step measures a received power of each of the plurality of currently captured perch channels;
   said obtaining step obtains, with respect to the received powers measured by said measuring step, the number of perch channels each of which has a received power whose ratio to the highest received power is greater than a predetermined value; and
   said control step controls the degree of how frequent the searches for the new perch channels are conducted in response to the number of perch channels obtained by said obtaining step such that when the number of perch channels is great, the degree of how frequent the searches for the new perch channels are conducted is high, whereas when the number of perch channels is small, the degree of how frequent the searches for the new perch channels are conducted is low.

5. The cell search control method as claimed in claim 1, wherein
   said measuring step measures a received SIR of each of the plurality of currently captured perch channels;
   said obtaining step obtains, with respect to the received SIRs measured by said measuring step, the highest received SIR; and
   said control step controls the degree of how frequent the searches for the new perch channels are conducted in response to the highest received SIR obtaining by said obtaining step such that when the highest received SIR is high, the degree of how frequent the searches for the new perch channels are conducted is low, whereas when the highest received SIR is low, the degree of how frequent the searches for the new perch channels are conducted is high.

6. The cell search control method as claimed in claim 1, wherein
said measuring step measures a received SIR of each of the plurality of currently captured perch channels;
said obtaining step obtains, with respect to the received SIRs measured by said measuring step, the ratio of the second highest received SIR to the highest received SIR; and
said control step controls the degree of how frequent the searches for the new perch channels are conducted in response to the ratio obtained by said obtaining step such that when the ratio is high, the degree of how frequent the searches for the new perch channels are conducted is high, whereas when the ratio is low, the degree of how frequent the searches for the new perch channels are conducted is low.

7. The cell search control method as claimed in claim 1, wherein
said measuring step measures a received SIR of each of the plurality of currently captured perch channels;
said obtaining step obtains, with respect to the received SIRs measured by said measuring step, the number of perch channels each of which has a received SIR whose ratio to the highest received SIR is greater than a predetermined value; and
said control step controls the degree of how frequent the searches for the new perch channels are conducted in response to the number of perch channels obtained by said obtaining step such that when the number of perch channels is great, the degree of how frequent the searches for the new perch channels are conducted is high, whereas when the number of perch channels is small, the degree of how frequent the searches for the new perch channels are conducted is low.

8. The cell search control method as claimed in claim 1, further comprising:
an extracting step of extracting transmission power information by receiving and decoding each of the plurality of currently captured perch channels, each of the perch channels including its own transmission power information, wherein
said measuring step measures a received power of each of the plurality of currently captured perch channels;
said obtaining step calculates a propagation loss between the mobile station and each of base stations that transmit the perch channels by using the received powers measured by said measuring step and the transmission powers of the perch channels with the received powers extracted by said extracting step, and obtains, with respect to the calculated propagation losses, the minimum propagation loss; and
said control step controls the degree of how frequent the searches for the new perch channels are conducted in response to the minimum propagation loss obtained by said obtaining step such that when the minimum propagation loss is high, the degree of how frequent the searches for the new perch channels are conducted is high, whereas when the minimum propagation loss is low, the degree of how frequent the searches for the new perch channels are conducted is low.

9. The cell search control method as claimed in claim 1, further comprising:
an extracting step of extracting transmission power information by receiving and decoding each of the plurality of currently captured perch channels, each of the perch channels including its own transmission power information, wherein
said measuring step measures a received power of each of the plurality of currently captured perch channels;
said obtaining step calculates a propagation loss between the mobile station and each of base stations that transmit the perch channels by using the received powers measured by said measuring step and the transmission powers of the perch channels with the received powers extracted by said extracting step, and obtains, with respect to the calculated propagation losses, the ratio of the second minimum propagation loss to the minimum propagation loss; and
said control step controls the degree of how frequent the searches for the new perch channels are conducted in response to the ratio the ratio obtained by said obtaining step such that when the ratio is low, the degree of how frequent the searches for the new perch channels are conducted is high, whereas when the ratio is high, the degree of how frequent the searches for the new perch channels are conducted is low.

10. The cell search control method as claimed in claim 1, further comprising:
an extracting step extracting transmission power information by receiving and decoding each of the plurality of currently captured perch channels, each of the perch channels including its own transmission power information, wherein
said measuring step measures a received power of each of the plurality of currently captured perch channels;
said obtaining step calculates a propagation loss between the mobile station and each of base stations that transmit the perch channels by using the received powers measured by said measuring step and the transmission powers of the perch channels with the received powers extracted by said extracting step, and obtains, with respect to the calculated propagation losses, the number of perch channels each of which has a propagation loss whose ratio to the minimum propagation loss is less than a predetermined value; and
said control step controls the degree of how frequent the searches for the new perch channels are conducted in response to the number of perch channels obtained by said obtaining step such that when the number of the perch channels is great, the degree of how frequent the searches for the new perch channels are conducted is high, whereas when the number of the perch channels is small, the degree of how frequent the searches for the new perch channels are conducted is low.

11. A cell search control method by which a mobile station searches for a perch channel transmitted by a base station to capture and receive the perch channel, and determines which base station to communicate with or to be standby for, said cell search control method comprising:
a measuring step of measuring transmission power of a signal to be transmitted to the base station that the mobile station currently communicate with or is currently standby for; and
a control step of controlling a degree of how frequent searches for new perch channels which are currently net captured are conducted in response to the lowest transmission power measured by said measuring step such that when the lowest transmission power is high, the degree of how frequent the searches for the new perch channels are conducted is high, whereas when the lowest transmission power is low, the degree of how frequent the searches for the new perch channels are conducted is low.

12. A cell search control method by which a mobile station searches for a perch channel transmitted by a base station to capture and receive the perch channel, and determines which base station to communicate with or to be standby for, said cell search control method comprising:
a detecting step of detecting a moving speed of the mobile station; and
a controlling step of controlling a degree of how frequent searches for new perch channels which are currently not captured are conducted in response to the moving speed detected by said detecting step such that when the moving speed is high, the degree of how frequent the searches for the new perch channels are conducted is high, whereas when the moving speed is low, the degree of how frequent the searches for the new perch channels are conducted is low.

13. A mobile station which searches for a perch channel transmitted by a base station to capture and receive the perch channel, and determines which base station to communicate with or to be standby for, said mobile station comprising:
measuring means for measuring a first receiving quality of each of a plurality of currently captured perch channel;
obtaining means for obtaining a second receiving quality from the first receiving qualities measured by said measuring means; and
control means for determining a degree of how frequent searches for new perch channels which are currently not captured are conducted in response to the second receiving quality obtained by said obtaining means.

14. The mobile station as claimed in claim 13, wherein
said measuring means measures a received power of each of the plurality of currently captured perch channels;
said obtaining means obtains, with respect to the received powers measured by said measuring means, the highest received power; and
said control means controls the degree of how frequent the searches for the new perch channels are conducted in response to the highest received power obtained by said obtaining means such that when the highest received power is high, the degree of how frequent the searches for the new perch channels are conducted is low, whereas when the highest received power is low, the degree of how frequent the searches for the new perch channels are conducted is high.

15. The mobile station as claimed in claim 13, wherein
said measuring means measures a received power of each of the plurality of currently captured perch channels;
said obtaining means obtains, with respect to the received powers measured by said measuring means, the ratio of the second highest received power to the highest received power; and
said control means controls the degree of how frequent the searches for the new perch channels are conducted in response to the ratio obtained by said obtaining means such that when the ratio is high, the degree of how frequent the searches for the new perch channels are conducted is high, whereas when the ratio is low, the degree of how frequent the searches for the new perch channels are conducted is low.

16. The mobile station as claimed in claim 13, wherein
said measuring means measures a received power of each of the plurality of currently captured perch channels;
said obtaining means obtains, with respect to the received powers measured by said measuring means, the number of perch channels each of which has a received power whose ratio to the highest received power is greater than a predetermined value; and
said control means controls the degree of how frequent the searches for the new perch channels are conducted in response to the number of perch channels obtained by said obtaining step such that when the number of perch channels is great, the degree of how frequent the searches for the new perch channels are conducted is high, whereas when the number of perch channels is small, the degree of how frequent the searches for the new perch channels are conducted is low.

17. The mobile station as claimed in claim 13, wherein
said measuring means measures a received SIR of each of the plurality of currently captured perch channels;
said obtaining means obtains, with respect to the received SIRs measured by said measuring means, the highest received SIR; and
said control means controls the degree of how frequent the searches for the new perch channels are conducted in response to the highest received SIR obtaining by said obtaining means such that when the highest received SIR is high, the degree of how frequent the searches for the new perch channels are conducted is low, whereas when the highest received SIR is low, the degree of how frequent the searches for the new perch channels are conducted is high.

18. The mobile station as claimed in claim 13, wherein
said measuring means measures a received SIR of each of the plurality of currently captured perch channels;
said obtaining means obtains, with respect to the received SIRs measured by said measuring means, the ratio of the second highest received SIR to the highest received SIR; and
said control means controls the degree of how frequent the searches for the new perch channels are conducted in response to the ratio obtained by said obtaining means such that when the ratio is high, the degree of how frequent the searches for the new perch channels are conducted is high, whereas when the ratio is low, the degree of how frequent the searches for the new perch channels are conducted is low.

19. The mobile station as claimed in claim 13, wherein
said measuring means measures a received SIR of each of the plurality of currently captured perch channels;
said obtaining means obtains, with respect to the received SIRs measured by said measuring means, the number of perch channels each of which has a received SIR whose ratio to the highest received SIR is greater than a predetermined value; and
said control means controls the degree of how frequent the searches for the new perch channels are conducted in response to the number of perch channels obtained by said obtaining means such that when the number of perch channels is great, the degree of how frequent the searches for the new perch channels are conducted is high, whereas when the number of perch channels is small, the degree of how frequent the searches for the new perch channels are conducted is low.

20. The mobile station as claimed in claim 13, further comprising:
extracting means for extracting transmission power information by receiving and decoding each of the plurality of currently captured perch channels, each of the perch channels including its own transmission power information, wherein said measuring means measures a received power of each of the plurality of currently captured perch channels;

said obtaining means calculates a propagation loss between the mobile station and each of base stations that transmit the perch channels by using the received powers measured by said measuring means and the transmission powers of the perch channels with the received powers extracted by said extracting means, and obtains, with respect to the calculated propagation losses, the minimum propagation loss; and said control means controls the degree of how frequent the searches for the new perch channels are conducted in response to the minimum propagation loss obtained by said obtaining means such that when the minimum propagation loss is high, the degree of how frequent the searches for the new perch channels are conducted is high, whereas when the minimum propagation loss is low, the degree of how frequent the searches for the new perch channels are conducted is low.

21. The mobile station as claimed in claim 13, further comprising:

extracting means for extracting transmission power information by receiving and decoding each of the plurality of currently captured perch channels, each of the perch channels including its own transmission power information, wherein said measuring means measures a received power of each of the plurality of currently captured perch channels;

said obtaining means calculates a propagation loss between the mobile station and each of base stations that transmit the perch channels by using the received powers measured by said measuring means and the transmission powers of the perch channels with the received powers extracted by said extracting means, and obtains, with respect to the calculated propagation losses, the ratio of the second minimum propagation loss to the minimum propagation loss; and said control means controls the degree of how frequent the searches for the new perch channels are conducted in response to the ratio the ratio obtained by said obtaining means such that when the ratio is low, the degree of how frequent the searches for the new perch channels are conducted is high, whereas when the ratio is high, the degree of how frequent the searches for the new perch channels are conducted is low.

22. The mobile station as claimed in claim 13, further comprising:

extracting means for extracting transmission power information by receiving and decoding each of the plurality of currently captured perch channels, each of the perch channels including its own transmission power information, wherein said measuring step measures a received power of each of the plurality of currently captured perch channels;

said obtaining means calculates a propagation loss between the mobile station and each of base stations that transmit the perch channels by using the received powers measured by said measuring means and the transmission powers of the perch channels with the received powers extracted by said extracting means, and obtains, with respect to the calculated propagation losses, the number of perch channels each of which has a propagation loss whose ratio to the minimum propagation loss is less than a predetermined value; and said control means controls the degree of how frequent the searches for the new perch channels are conducted in response to the number of perch channels obtained by said obtaining means such that when the number of the perch channels is great, the degree of how frequent the searches for the new perch channels are conducted is high, whereas when the number of the perch channels is small, the degree of how frequent the searches for the new perch channels are conducted is low.

23. The mobile station as claimed in claim 13, wherein said mobile station monitors paging to itself by intermittent reception in a standby mode.

24. A mobile station which searches for a perch channel transmitted by a base station to capture and receive the perch channel, and determines which base station to communicate with or to be standby for, said mobile station comprising:

measuring means for measuring transmission power of a signal to be transmitted to the base station that the mobile station currently communicate with or is currently standby for; and control means for controlling a degree of how frequent searches for new perch channels which are currently not captured are conducted in response to the lowest transmission power measured by said measuring means such that when the lowest transmission power is high, the degree of how frequent the searches for the new perch channels are conducted is high, whereas when the lowest transmission power is low, the degree of how frequent the searches for the new perch channels are conducted is low.

25. The mobile station as claimed in claim 24, wherein said mobile station monitors paging to itself by intermittent reception in a standby mode.

26. A mobile station which searches for a perch channel transmitted by a base station to capture and receive the perch channel, and determines which base station to communicate with or to be standby for, said mobile station comprising:

detecting means for detecting a moving speed of the mobile station; and control means for controlling a degree of how frequent searches for new perch channels which are currently not captured are conducted in response to the moving speed detected by said detecting means such that when the moving speed is high, the degree of how frequent the searches for the new perch channels are conducted is high, whereas when the moving speed is low, the degree of how frequent the searches for the new perch channels are conducted is low.

27. The mobile station as claimed in claim 26, wherein said mobile station monitors paging to itself by intermittent reception in a standby mode.

28. A mobile communications system including a plurality of base stations and a mobile station which searches for perch channels transmitted by the plurality of base stations to capture and receive the perch channels, and determines which base station to communicate with or to be standby for, said mobile station comprising:

measuring means for measuring a first receiving quality of each of a plurality of currently captured perch channel;

obtaining means for obtaining a second receiving quality from the first receiving qualities measured by said measuring means; and control means for determining a degree of how frequent searches for new perch channels which are currently not captured are conducted in response to the second receiving quality obtained by said obtaining means.

29. A mobile communications system including a plurality of base stations and a mobile station which searches for perch channels transmitted by the plurality of base stations to capture and receive the perch channels, and determines which base station to communicate with or to be standby for, said mobile station comprising:

measuring means for measuring transmission power of a signal to be transmitted to the base station that the mobile station currently communicate with or is currently standby for; and control means for controlling a degree of how frequent searches for new perch channels which are currently not captured are conducted in response to the lowest transmission power measured by said measuring means such that when the lowest transmission power is high, the degree of how frequent the searches for the new perch channels are conducted is high, whereas when the lowest transmission power is low, the degree of how frequent the searches for the new perch channels are conducted is low.

30. A mobile communications system including a plurality of base stations and a mobile station which searches for perch channels transmitted by the plurality of base stations to capture and receive the perch channels, and determines which base station to communicate with or to be standby for, said mobile station comprising:

detecting means for detecting a moving speed of the mobile station; and control means for controlling a degree of how frequent searches for new perch channels which are currently not captured are conducted in response to the moving speed detected by said detecting means such that when the moving speed is high, the degree of how frequent the searches for the new perch channels are conducted is high, whereas when the moving speed is low, the degree of how frequent the searches for the new perch channels are conducted is low.

\* \* \* \* \*

UNITED STATES PATENT AND TRADEMARK OFFICE
CERTIFICATE OF CORRECTION

| | | |
|---|---|---|
| PATENT NO. | : 7,139,571 B1 | Page 1 of 1 |
| APPLICATION NO. | : 09/616013 | |
| DATED | : November 21, 2006 | |
| INVENTOR(S) | : Ishikawa et al. | |

It is certified that error appears in the above-identified patent and that said Letters Patent is hereby corrected as shown below:

Title Page
Page 1, Column 1, Item 56, References Cited, insert reference:
--6,195,551     2/2001          Kim et al.--

Title Page
Page 2, Column 1, Item 56, Foreign Patent Documents, remove duplicate reference:
"GB    2328582  A    2/1999"

Signed and Sealed this

Thirteenth Day of November, 2007

JON W. DUDAS
*Director of the United States Patent and Trademark Office*